(12) United States Patent
Baldauf et al.

(10) Patent No.: US 11,187,174 B2
(45) Date of Patent: Nov. 30, 2021

(54) METHOD FOR MONITORING CRANKCASE PRESSURE

(71) Applicant: MTU FRIEDRICHSHAFEN GMBH, Friedrichshafen (DE)

(72) Inventors: Johannes Baldauf, Wangen (DE); Patrick Dussler, Ravensburg (DE); Eugen Bucher, Friedrichshafen (DE); Vadzim Khakholka, Friedrichshafen (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 237 days.

(21) Appl. No.: 16/489,100

(22) PCT Filed: Nov. 16, 2017

(86) PCT No.: PCT/EP2017/001342
§ 371 (c)(1),
(2) Date: Aug. 27, 2019

(87) PCT Pub. No.: WO2018/157907
PCT Pub. Date: Sep. 7, 2018

(65) Prior Publication Data
US 2020/0109676 A1    Apr. 9, 2020

(30) Foreign Application Priority Data
Feb. 28, 2017  (DE) .................... 10 2017 001 904.5

(51) Int. Cl.
*F02D 41/06* (2006.01)
*F02D 41/24* (2006.01)
(Continued)

(52) U.S. Cl.
CPC ......... *F02D 41/062* (2013.01); *F02D 41/061* (2013.01); *F02D 41/22* (2013.01);
(Continued)

(58) Field of Classification Search
CPC ...... F02D 41/061; F02D 41/062; F02D 41/22; F02D 41/2451; F02D 41/2493; F02D 2250/08; F01M 13/00; F01M 2013/0083
See application file for complete search history.

(56) References Cited

U.S. PATENT DOCUMENTS 4,644,920 A * 2/1987 Abe .................... F02D 41/1495
123/479
5,792,949 A * 8/1998 Hewelt ................. G01M 3/025
123/41.86
(Continued)

FOREIGN PATENT DOCUMENTS

CN        101907026 A    12/2010
CN        102966409 A    3/2013
(Continued)

*Primary Examiner* — John M Zaleskas
(74) *Attorney, Agent, or Firm* — Lucas & Mercanti, LLP; Klaus P. Stoffel

(57) ABSTRACT

A method for monitoring crankcase pressure, in which a learning curve is calculated according to a target-actual deviation of the crankcase pressure, the target crankcase pressure is adjusted according to the learning curve, and a limit curve is calculated according to the target crankcase pressure. The actual crankcase pressure is monitored for exceedance of the limit curve. After an engine start, upon identification of a steady-state operation of the internal combustion engine, the actual crankcase pressure is compared with a limit value and, if the limit value is identified as being exceeded, the learning curve and, as a result, the limit curve are reset to their initial values.

5 Claims, 1 Drawing Sheet

(51) Int. Cl.
  *F02D 41/22* (2006.01)
  *F01M 13/00* (2006.01)
(52) U.S. Cl.
  CPC ..... *F02D 41/2451* (2013.01); *F02D 41/2493*
    (2013.01); *F01M 13/00* (2013.01); *F01M*
    *2013/0083* (2013.01); *F02D 2200/024*
    (2013.01); *F02D 2250/08* (2013.01)

(56) References Cited

U.S. PATENT DOCUMENTS

| | | | | |
|---|---|---|---|---|
| 6,240,772 | B1* | 6/2001 | Thomas | G01M 15/09 73/114.01 |
| 6,546,321 | B1 | 4/2003 | Ohkubo | |
| 8,555,831 | B2 | 10/2013 | Paa | |
| 9,909,470 | B2 | 3/2018 | Christian | |
| 10,221,797 | B2 | 3/2019 | Hönl | |
| 2002/0139331 | A1 | 10/2002 | Takahashi | |
| 2005/0022795 | A1* | 2/2005 | Beyer | F01M 11/10 123/516 |
| 2010/0170474 | A1* | 7/2010 | Yamaguchi | F02D 31/008 123/339.12 |
| 2013/0228006 | A1* | 9/2013 | Kuhn | F02D 41/18 73/114.33 |
| 2014/0076249 | A1* | 3/2014 | Rollinger | F02M 35/09 123/41.86 |
| 2014/0081549 | A1* | 3/2014 | Rollinger | F02N 11/10 701/101 |
| 2014/0081550 | A1* | 3/2014 | Jentz | F01M 1/18 701/101 |
| 2014/0081551 | A1* | 3/2014 | Rollinger | F01M 13/023 701/101 |
| 2014/0081564 | A1* | 3/2014 | Pursifull | G01M 15/08 701/113 |
| 2015/0247471 | A1* | 9/2015 | Hamamoto | F02D 41/2464 701/106 |
| 2016/0097354 | A1 | 4/2016 | Martus | |
| 2016/0097355 | A1* | 4/2016 | Jentz | F02D 41/22 701/102 |
| 2016/0319762 | A1* | 11/2016 | Honl | F02D 41/22 |
| 2017/0175662 | A1* | 6/2017 | Yoshioka | F02D 41/22 |
| 2018/0283976 | A1* | 10/2018 | Shiwa | G01M 3/3236 |
| 2019/0226368 | A1* | 7/2019 | Hofmann | F02D 41/22 |

FOREIGN PATENT DOCUMENTS

| | | |
|---|---|---|
| CN | 203962158 U | 11/2014 |
| CN | 106030059 A | 10/2016 |
| CN | 106065798 A | 11/2016 |
| DE | 102013021295 B3 | 5/2015 |
| DE | 102013224030 D4 | 5/2015 |
| DE | 102014114397 A1 | 4/2016 |
| EP | 1921300 A1 | 5/2008 |
| WO | 2008099276 A1 | 8/2008 |

* cited by examiner

METHOD FOR MONITORING CRANKCASE PRESSURE

CROSS-REFERENCE TO RELATED APPLICATIONS

The present application is a 371 of International application PCT/EP2017/001342, filed Nov. 16, 2017, which claims priority of DE 10 2017 001 904.5, filed Feb. 28, 2017, the priority of these applications is hereby claimed and these applications are incorporated herein by reference.

BACKGROUND OF THE INVENTION

The invention relates to a method for monitoring crankcase pressure.

DE 10 2013 021 295 B3 discloses a method for monitoring crankcase pressure, in which in a first feature a crankcase pressure monitoring is carried out on the basis of a limit curve. The limit curve is calculated according to the target crankcase pressure and an offset value. If the current actual-crankcase pressure exceeds the value of the limit curve, a safety-critical error is displayed to the operator of the internal combustion engine. A second feature includes updating the target crankcase pressure on the basis of a learning curve. The learning curve is determined from an average value of target crankcase pressure values, the deviation thereof from the actual crankcase pressure, and a weighting factor. The learning curve is then used to update the target crankcase pressure accordingly.

A crankcase ventilation is implemented as a closed circuit. In this case, the blow-by is extracted from the crankcase by suction, de-oiled and fed back to the fresh-air side, for example upstream of an exhaust turbocharger. Typically, an air filter is arranged in the air path of the internal combustion engine, the airflow rate of which deteriorates during operation. The method described in DE 10 2013 021 295 B3 responds to a deteriorating air infeed via the updating of the learning curve and the limit curve. In practice, it has now been shown that a replacement of the air filter may lead to an unexpected fault display.

SUMMARY OF THE INVENTION

The object of the invention is therefore to improve the method known from the prior art.

The innovation lies in the fact that after the engine is started and steady-state operation of the internal combustion engine is detected, the actual crankcase pressure is compared with a limit value. If limit values are exceeded, the measure taken is that the learning curve, and as a result the limit curve, are reset to their initial values. After the learning curve and the limit curve have been reset, the method switches into the crankcase pressure monitoring mode proper, as is disclosed in DE 10 2013 021 295 B3. A steady-state operation occurs when the engine speed and the engine torque are constant. An advantageous feature is that an air filter change is detected by the method with complete certainty, and therefore unwanted error messages are eliminated. The method according to the invention offers the operator of the internal combustion engine the advantage that he/she can perform an air filter change him/herself, i.e. without the engine manufacturer's service technician, and nevertheless continue to use the internal combustion engine with its full functionality.

The initial value to which the learning curve or the limit curve is set corresponds to the original value in the new condition of the internal combustion engine. In other words, the characteristic curves/characteristic maps are re-populated with the original data. In one alternative it is provided that the initial value is set to a corrected original value, the original value being corrected on the basis of the load profile of the internal combustion engine or the operating lifetime of the internal combustion engine. Typically, the load profile is determined as a function of the engine speed and the engine torque, for example on the basis of the DIN-classification procedures.

To increase the process reliability it is provided that the actual crankcase pressure is compared with a limit value only within a specifiable time. After this time has elapsed, a changeover is immediately made into the crankcase pressure monitoring mode proper.

DETAILED DESCRIPTION OF THE INVENTION

Figure 1:
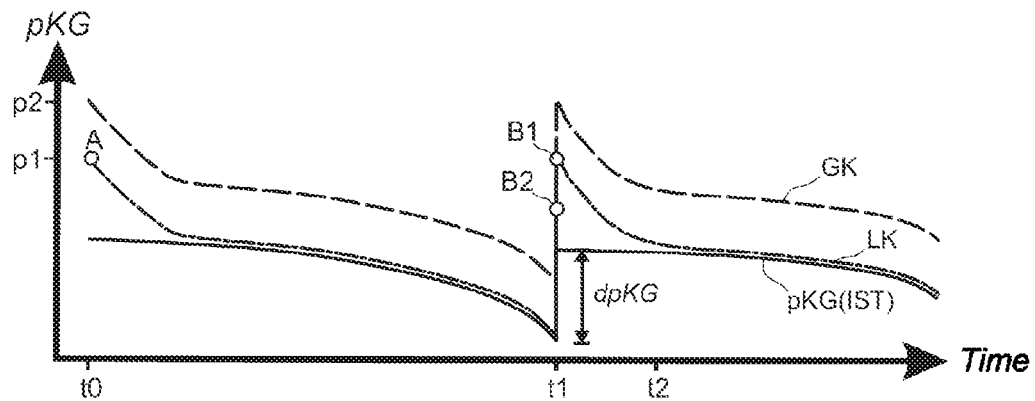
FIG. 1 a time graph and
FIG. 2 a program flowchart

FIG. 1 shows the crankcase pressure pKG over time. There are three curves shown in the graph. In these pKG (IST) identifies the actual crankcase pressure, LK the learning curve and GK the limit curve. The learning curve LK is determined from an average value, the deviation thereof from the actual crankcase pressure and from a weighting factor. The mean value is in turn calculated from values of the target crankcase pressure, which are stored in a corresponding characteristic map. Via the learning curve LK, the target crankcase pressure is updated according to the deviation from the actual crankcase pressure pKG(IST). The limit curve GK is calculated according to the target crankcase pressure and an offset value. The initial values of the actual crankcase pressure pKG(IST), the learning curve LK and the limit curve GK correspond to the values at time t0. For the learning curve LK this is the pressure value p1 and for the limit curve GK this is the pressure value p2.

In the following, it is assumed that the actual crankcase pressure pKG(IST) changes to lower pressure values. This trajectory is caused by a clogging air filter, i.e., the air volume flow decreases. Due to the previously described dependency, both the learning curve LK and the limit curve GK follow the curve of the actual crankcase pressure pKG (IST). Before a time t1, the internal combustion engine is disabled and the last value of the learning curve LK is stored in the engine electronic control unit.

The internal combustion engine is then restarted, thus after completion of the starting procedure it is necessary to wait until a steady-state operating state is detected. In the case of an emergency generator a steady-state operating state exists when the internal combustion engine has reached its stable target speed, for example 1500 rpm, corresponding to 50 Hz. The steady-state operating condition is detected at time t1. The invention then provides that, after the expiry of a time step at time t1, it is checked whether the actual crankcase pressure actual pKG(IST) is greater than a limit value dpKG. In the curve shown in FIG. 1 of the actual crankcase pressure pKG(IST), this is the case. The reason for the modified curve of the actual crankcase pressure pKG(IST) is a replacement of the air filter. To increase the process reliability it can be provided that a further specifiable time is allowed to elapse until a response occurs to the modified curve of the actual crankcase pressure pKG(IST). After this time step has expired, both the learning curve LK and the limit curve GK are reset to their initial values. The initial values can correspond to the original values, thus the originally applied data values for the internal combustion engine when new. This case is shown in FIG. 1. The learning curve LK therefore has the same pressure level p1 at time t0 and at time t1. In the figure this is identified by the two points A and B1. Accordingly, the learning curve GK has the same pressure level p2 at time t0 and at time t1. After resetting the learning curve LK and the limit curve GK a change is made into the crankcase pressure monitoring mode.

In an alternative embodiment it is provided that the learning curve LK and the limit curve GK are set to corrected original values. For example, the correction is calculated on the basis of the load profile of the internal combustion engine or the operating lifetime of the internal combustion engine. Typically, the load profile is determined as a function of the engine speed and the engine torque, for example via the dwell time in the appropriate speed and engine torque classes. In this embodiment, the learning curve LK is then corrected to a smaller value of the crankcase pressure at time t1. In FIG. 1 the corrected original value is identified by the point B2. For the limit curve GK, this applies in a modified form.

Figure 2:
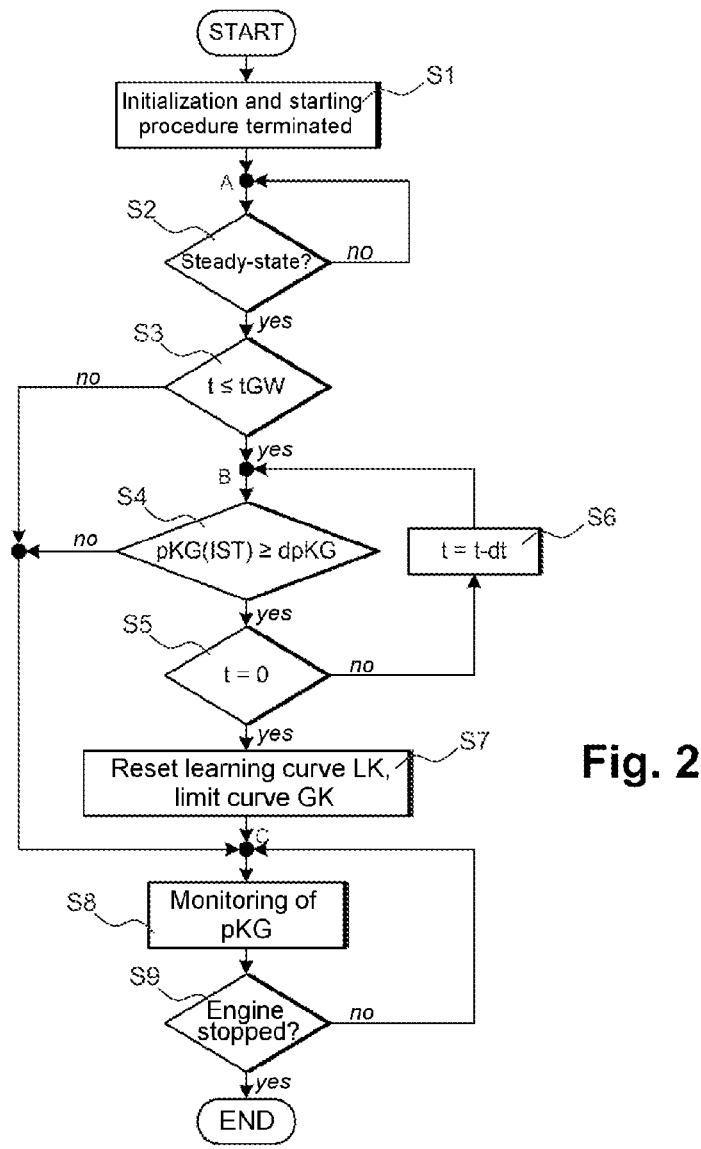

FIG. 2 shows a program flowchart. In S1, after the initialization of the engine electronic control unit a time is first allowed to elapse until the startup procedure has completed. In S2 it is checked whether a steady-state operating condition exists. If this is not the case, query result S2: no, the program branches back to point A. If, on the other hand, a steady-state operating condition has been detected, query result S2: yes, then at S3 directly thereafter, it is checked whether a time step tGW has not yet elapsed. This time step tGW, for example fifteen minutes, is set on the completion of the startup procedure. If the result of the check at S3 is that the time step tGW has already expired, query result S3: no, the program branches to S8 and changes into the crankcase pressure monitoring mode. If, on the other hand, the time tGW has not yet expired, query result S3: yes, it is branched to S4 and checked whether the actual crankcase pressure pKG(IST) is greater than or equal to a limit value dpKG. This is the case if the air filter has been replaced. If the actual crankcase pressure pKG(IST) is not greater, query result S4: no, the program branches to point C. This program path is then followed if the air filter has not been changed. If at S4 it is found that the actual crankcase pressure pKG(IST) is greater than or equal to the limit value dpKG, query result S3: yes, then at S5 it is checked whether the time step t has elapsed. If this is not the case, query result S5: no, at S6 the time is reduced and the program branches back to point B. If at S5, on the other hand, it is detected that the time step t has elapsed, query result: yes, then at S7 the learning curve LK and the limit curve GK are reset to their initial values. The initial values correspond to the original values, thus the originally applied data values for the internal combustion engine when new. Alternatively, the initial values can also be corrected in accordance with the load profile of the internal combustion engine or the operating lifetime of the internal combustion engine. Thereafter, at S8 the crankcase pressure monitoring mode is set and at S9 it is checked whether an engine stop has been detected. If this is not the case, query result S9: no, then the program branches back to point C, otherwise the program execution is terminated.

The invention claimed is:

1. A method for monitoring crankcase pressure of an internal combustion engine, comprising the steps of: calculating a learning curve according to a target-actual deviation of the crankcase pressure; adjusting a target crankcase pressure according to the learning curve; calculating a limit curve according to the target crankcase pressure; monitoring actual crankcase pressure for exceedance of the limit curve; and after an engine start, upon identification of a steady-state operation of the internal combustion engine, determining that the actual crankcase pressure exceeds a limit value, and resetting the learning curve to a first initial value and the limit curve to a second initial value when the actual crankcase pressure exceeds the limit value.

2. The method according to claim 1, including setting the first initial value to a first original value of the learning curve in a new condition of the internal combustion engine and setting the second initial value to a second original value of the limit curve in the new condition of the internal combustion engine.

3. The method according to claim 1, including correcting original values of the learning curve and the limit curve based on a load profile of the internal combustion engine or an operating lifetime of the internal combustion engine, and setting the first and second initial values to the corrected original values of the learning curve and the limit curve.

4. The method according to claim 3, including comparing the actual crankcase pressure with the limit value within a specifiable time.

5. The method according to claim 4, including changing into a crankcase pressure monitoring mode after the resetting of the learning curve and the limit curve.

\* \* \* \* \*